(12) United States Patent
Hirabayashi et al.

(10) Patent No.: US 10,720,813 B2
(45) Date of Patent: Jul. 21, 2020

(54) ROTARY APPARATUS

(71) Applicant: Minebea Mitsumi Inc., Nagano (JP)

(72) Inventors: Koichiro Hirabayashi, Hirakata (JP); Yukimasa Matsumura, Kikugawa (JP); Akiko Ikuta, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 430 days.

(21) Appl. No.: 15/652,382

(22) Filed: Jul. 18, 2017

(65) Prior Publication Data

US 2018/0034345 A1 Feb. 1, 2018

(30) Foreign Application Priority Data

Jul. 29, 2016 (JP) .................................. 2016-149825

(51) Int. Cl.
| | |
|---|---|
| *H02K 7/06* | (2006.01) |
| *H02K 7/116* | (2006.01) |
| *H02K 5/24* | (2006.01) |
| *F16H 57/028* | (2012.01) |
| *F16H 1/20* | (2006.01) |

(Continued)

(52) U.S. Cl.
CPC ........... *H02K 7/1166* (2013.01); *F16H 1/203* (2013.01); *F16H 57/028* (2013.01); *F16H 57/039* (2013.01); *H02K 5/161* (2013.01); *H02K 5/24* (2013.01); *F16H 37/041* (2013.01); *F16H 2057/02034* (2013.01)

(58) Field of Classification Search
CPC .............................. H02K 7/1166; F16H 1/203
See application file for complete search history.

(56) References Cited

U.S. PATENT DOCUMENTS 5,839,320 A * 11/1998 Komachi ................. H02K 5/08
74/425
2005/0052087 A1   3/2005 Shinmura et al.
(Continued)

FOREIGN PATENT DOCUMENTS

JP             3-63052 U     6/1991
JP        2005-110489 A      4/2005
(Continued)

OTHER PUBLICATIONS

Japanese Office Action dated Nov. 26, 2019 for corresponding Japanese Application No. 2016-149825 and English translation.
(Continued)

*Primary Examiner* — Alexander Talpalatski
(74) *Attorney, Agent, or Firm* — Pearne & Gordon LLP

(57) ABSTRACT

A rotary apparatus includes a motor including a rotary shaft, a plurality of gears including an output gear, and a housing accommodating the motor and the plurality of gears. The housing is separable into a first housing and a second housing. The motor includes a first end portion and a second end portion located on an opposite side of the first end portion. The rotary shaft is derived from the first end portion. The second housing includes a first regulating portion regulating a position of a part of the motor on the first end portion. The first housing includes a projecting portion projecting toward the second housing side. The projecting portion urges the second end portion of the motor toward the first regulating portion side directly or via another member.

3 Claims, 9 Drawing Sheets

(51) Int. Cl.
    *F16H 57/039*     (2012.01)
    *H02K 5/16*     (2006.01)
    *F16H 37/04*     (2006.01)
    *F16H 57/02*     (2012.01)

(56) References Cited

U.S. PATENT DOCUMENTS

| | | |
|---|---|---|
| 2010/0001604 A1 | 1/2010 | Hayakawa et al. |
| 2014/0312726 A1* | 10/2014 | Wu .......................... H02K 5/04 310/83 |
| 2015/0381016 A1 | 12/2015 | Tsuda et al. |

FOREIGN PATENT DOCUMENTS

| | | |
|---|---|---|
| JP | 2005-335519 A | 12/2005 |
| JP | 2006-025522 A | 1/2006 |
| JP | 2008-174111 A | 7/2008 |
| JP | 2013-090502 A | 5/2013 |
| JP | 2015220969 A | 12/2015 |
| JP | 2016-127767 A | 7/2016 |

OTHER PUBLICATIONS

Information Statement dated Apr. 12, 2018 for corresponding Japanese Application No. 2016-149825 and English translation.

* cited by examiner

ROTARY APPARATUS

CROSS REFERENCE TO RELATED APPLICATIONS

This application claims the benefit of Japanese Patent Application No. 2016-149825, filed Jul. 29, 2016, which is hereby incorporated by reference in its entirety.

BACKGROUND

Technical Field

The present disclosure relates to a rotary apparatus.

Background

For example, Japanese Patent Laid-Open No. 2015-220969 discloses a motor actuator (rotary apparatus) that drives a plurality of doors (louvers) provided in an air passage for flowing air of a vehicle air conditioning system.

Recent years have seen a tendency toward increased quietness in an intra-vehicle environment. For example, a motor-driven vehicle such as an electric car emits no noise from the internal-combustion engine and thus the inside of the vehicle is remarkably quiet.

Such high degree of quietness emphasizes noise which otherwise would not be noticeable inside a car equipped with an internal combustion engine, and thus higher degree of low noise than ever before is considered to be required even in various parts of the car.

SUMMARY

The present disclosure is related to providing a rotary apparatus with improved quietness.

In accordance with one aspect of the present disclosure, (1) A rotary apparatus comprises: a motor including a rotary shaft; a plurality of gears including an output gear; and a housing accommodating the motor and the plurality of gears, wherein the housing is separable into a first housing and a second housing; the motor includes a first end portion and a second end portion located on an opposite side of the first end portion, the rotary shaft being derived from the first end portion; the second housing includes a first regulating portion regulating a position of a part of the motor on the first end portion side; the first housing includes a projecting portion projecting toward the second housing side; and the projecting portion urges the second end portion of the motor toward the first regulating portion side directly or via another member.

(2) In the configuration of (1) above, the second housing includes a second regulating portion regulating a position of a part of the motor on the second end portion side and a receiving portion receiving the projecting portion, the receiving portion is spaced apart from the second end portion of the motor in a rotary shaft direction; and the projecting portion is press-fitted between the receiving portion and the second regulating portion.

(3) In the configuration of (2) above, the second end portion of the motor includes a second bearing portion; the second regulating portion includes a wall portion facing the second bearing portion in the rotary shaft direction; the receiving portion includes a surface portion facing the wall portion; and the projecting portion is press-fitted between the surface portion and the wall portion.

(4) In the configuration of (3) above, the second regulating portion includes a pair of side portions coupled with the wall portion, and the second bearing portion is arranged between the pair of side portions.

(5) In the configuration of (3) above, the receiving portion is spaced apart by a first distance from the wall portion in the rotary shaft direction, and a width of a part of the projecting portion inserted between the receiving portion and the wall portion is greater than the first distance.

(6) In the configuration of (1) above, the second end portion of the motor includes a second bearing portion; the second housing includes a receiving portion receiving the projecting portion; the receiving portion is spaced apart by the first distance from the second bearing portion in the rotary shaft direction; and the projecting portion is press-fitted between the second bearing portion and the receiving portion.

(7) In the configuration of (6) above, the projecting portion directly urges the second bearing portion toward the first regulating portion side.

(8) In the configuration of (6) above, the second housing includes a second regulating portion regulating a position of a part of the motor on the second end portion side; the second regulating portion includes a wall portion facing the second bearing portion in the rotary shaft direction; the wall portion includes a recessed portion opened toward the first housing side; and the projecting portion is inserted into the recessed portion.

(9) In the configuration of any one of (6) above, the width of a part of the projecting portion inserted between the receiving portion and the second bearing portion is greater than the first distance.

(10) In the configuration of (5) above, a distal end portion of the projecting portion is wedge-shaped and has a size smaller than the first distance at a tip of the distal end portion.

(11) A rotary apparatus includes: a motor having a rotary shaft; a plurality of gears including an output gear; and a housing accommodating the motor and the gears, wherein the housing is separable into a first housing and a second housing; the motor includes a first end portion and a second end portion located on an opposite side of the first end portion, the rotary shaft being derived from the first end portion; the second housing includes a second regulating portion regulating a position of a part of the motor on the second end portion side; the first housing includes a projecting portion projecting toward the second housing side; and the projecting portion urges the first end portion of the motor toward the second regulating portion side directly or via another member.

(12) In the configuration of (11) above, the second housing includes a receiving portion spaced apart from the first end portion of the motor in the rotary shaft direction away from the motor, wherein the projecting portion is press-fitted between the receiving portion and the second regulating portion.

(13) In the configuration of (2) above, in a state where the first housing can be separated from the second housing, the motor can be press-fitted between the first regulating portion and the second regulating portion.

(14) A rotary apparatus comprises a first housing, a second housing, and a motor, wherein the motor is arranged between the first housing and the second housing; the first housing includes a first projecting portion projecting toward the second housing, the first projecting portion being provided inside the first housing; the second housing includes a contact portion contacting one surface of two surfaces of the motor in a rotary shaft direction; and the first projecting portion urges another surface of the two surfaces of the motor toward the contact portion directly or via another member.

(15) In the configuration of (14) above, the rotary apparatus includes a plurality of gears arranged between the first housing and the second housing, wherein the motor includes a rotary shaft contacting the gears.

The present disclosure can provide a rotary apparatus with improved quietness.

DETAILED DESCRIPTION

Figure 1:
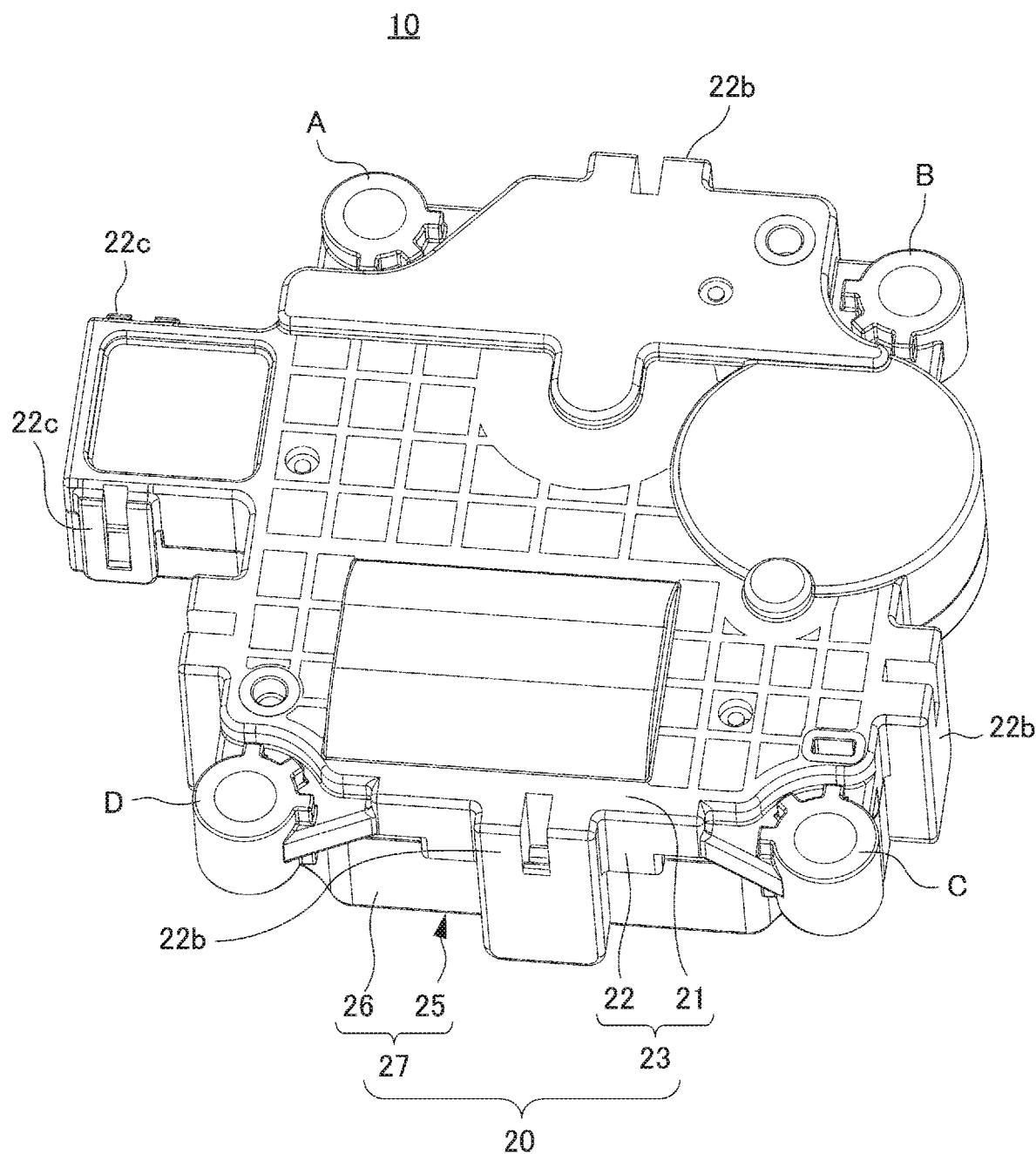
FIG. 1 is a perspective view of a rotary apparatus according to a first embodiment of the present disclosure.

Hereinafter, the modes for practicing the disclosure (hereinafter referred to as "embodiments") will be described in detail with reference to the accompanying drawings.

It should be noted that throughout the description of the embodiments, the same reference numerals or characters are assigned to the same components.

First Embodiment

FIG. 1 is a perspective view of a rotary apparatus 10 according to a first embodiment.

As illustrated in FIG. 1, the rotary apparatus 10 includes a housing 20 formed by coupling a first housing 23 and a second housing 27.

The first housing 23 and the second housing 27 are formed of a resin material such as polypropylene, polyethylene terephthalate, and ABS resins.

The first housing 23 includes a first surface portion 21 as a surface portion and a first sidewall portion 22 provided at an outer peripheral portion of the first surface portion 21. At four corners of the first housing 23, the first housing 23 includes attaching portions A, B, C, and D formed integrally with an outer periphery of the first sidewall portion 22. The attaching portions A, B, C, and D are for attaching the rotary apparatus 10 to an air conditioner or the like of an air conditioning system.

The first sidewall portion 22 serves as a part of a tubular portion of the housing 20.

In a plan view, the tubular portion of the housing 20 has, in the illustrated example, a polygonal shape (outer shape) having a plurality of corner portions.

In addition, the second housing 27 includes a second surface portion 25 as a surface portion and a second sidewall portion 26 provided at the outer peripheral portion of the second surface portion 25.

The second sidewall portion 26 also serves as a part of the tubular portion of the housing 20.

In other words, the first sidewall portion 22 and the second sidewall portion 26 form the tubular portion of the housing 20.

Figure 2:
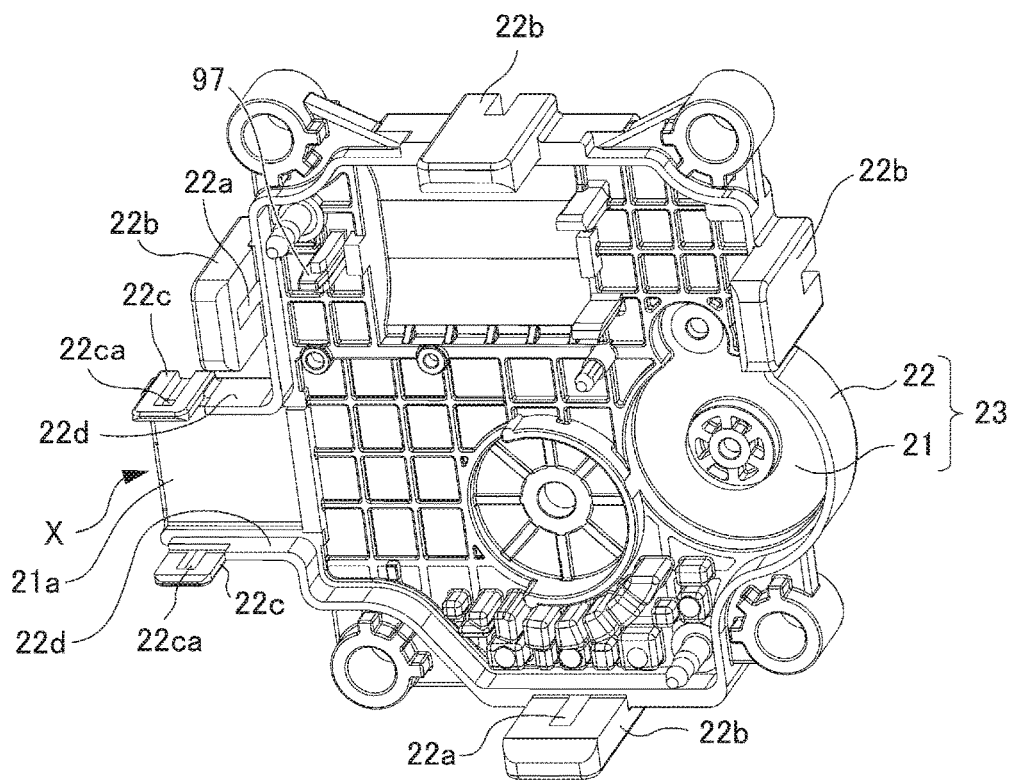
FIG. 2 is a perspective view illustrating the rotary apparatus according to the first embodiment of the present disclosure with a first housing and a second housing being separated to show inside of a housing.
Figure 2:
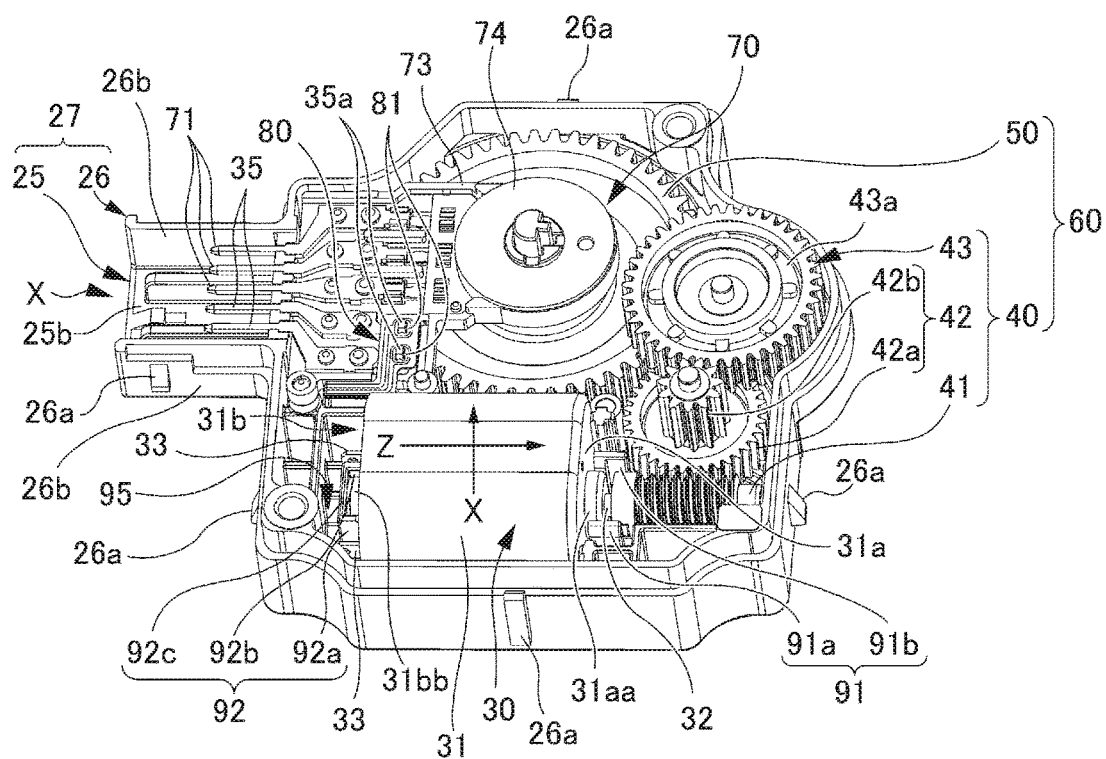
Figure 3:
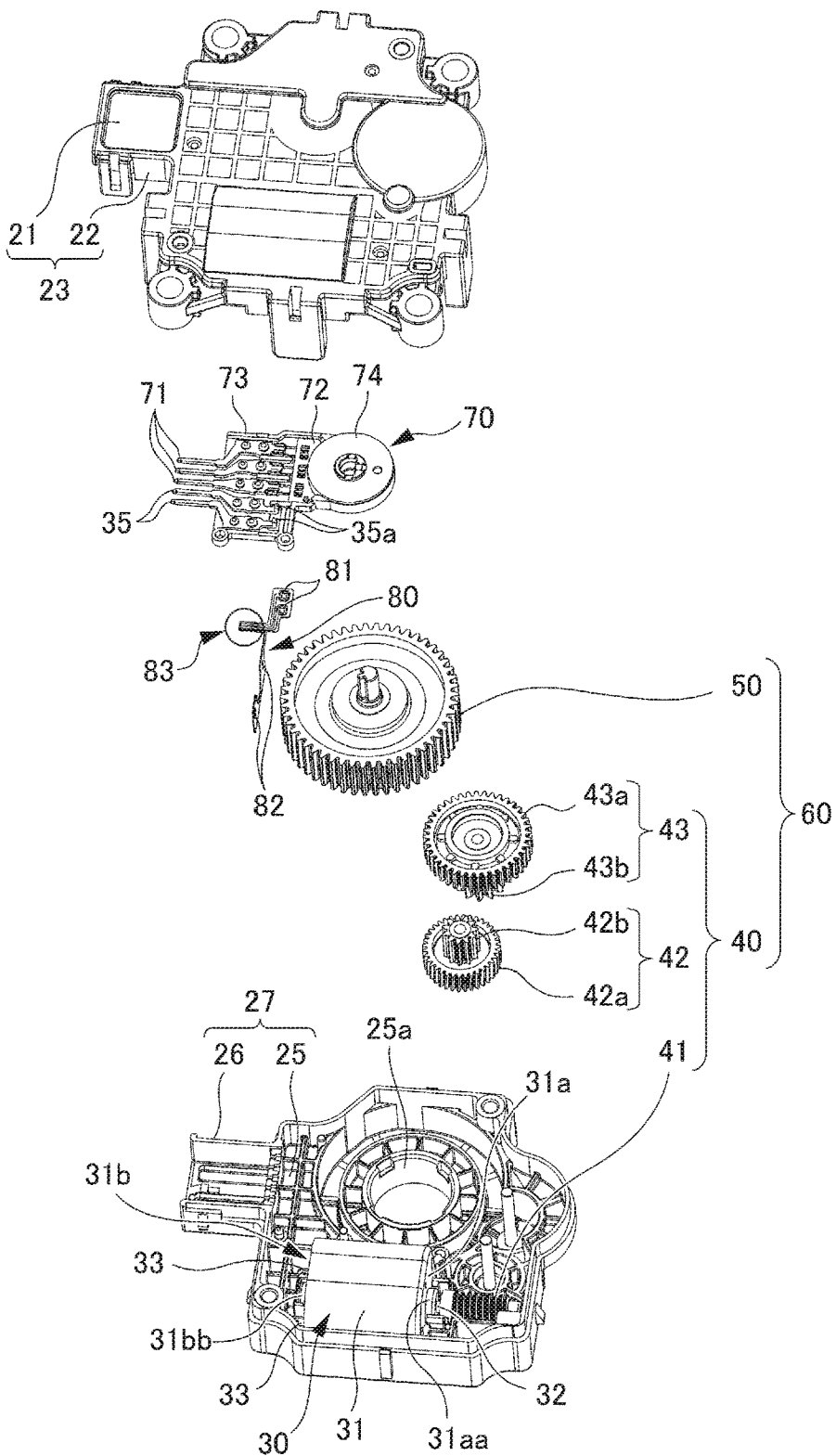
FIG. 3 is an exploded perspective view of the rotary apparatus according to the first embodiment of the present disclosure.

FIG. 2 is a perspective view illustrating inside of the rotary apparatus 10 with the first housing 23 and the second housing 27 being separated to shown inside the housing 20. FIG. 3 is an exploded perspective view of the rotary apparatus 10.

As illustrated in FIG. 2, the first housing 23 includes a plurality of engaging portions 22b formed integrally with the first sidewall portion 22. The engaging portions 22b are located at the outer periphery of the first sidewall portion 22 and extend toward the second housing 27. A recessed portion 22a is formed in an inner surface of each engaging portion 22b.

As used herein, the term "inner surface" refers to a surface facing the inside of the first housing 23.

An accommodating portion accommodating an external connector is provided at the tubular portion of the housing 20.

The accommodating portion serves to form a connector of the rotary apparatus 10 to be described later.

The accommodating portion includes parts 22d of the first sidewall portion 22 of the first housing 23 facing each other, a part 21a of the first surface portion 21 bridging the parts 22d, parts 26b of the second sidewall portion 26 of the second housing 27 facing each other, and a part 25b of the second surface portion 25 of the second housing 27 bridging the parts 26b.

The parts 22d of the first sidewall portion 22 and the parts 26b of the second sidewall portion 26 are shaped to project outward from the other part of the first sidewall portion 22 forming the tubular portion of the housing 20 and the other part of the second sidewall portion 26.

Note that regarding a region X forming the accommodating portion accommodating the external connector, a pair of engaging portions 22c are likewise formed integrally with the first sidewall portion 22 and extends toward the second housing 27 on the first sidewall portion 22. Each engaging portion 22c is provided with a hole 22ca.

The second housing 27 includes a plurality of projections 26a formed integrally with the second sidewall portion 26 on the outer peripheral surface of the second sidewall portion 26 at positions corresponding to the plurality of engaging portions 22b and the pair of engaging portions 22c of the first housing 23. The projections 26a engage with concave portions 22a of the engaging portions 22b and holes 22ca of the engaging portions 22c, respectively.

The projections 26a serve as engagement portions to be engaged with the engaging portions 22b and the pair of engaging portions 22c.

The first housing 23 is joined with the second housing 27 by engaging the projections 26a of the second housing 27 with the concave portions 22a of the engaging portion 22b of the first housing 23 and the holes 22ca of the engaging portion 22c, thereby integrating the first housing 23 with the second housing 27. In this manner, the housing 20 (see FIG. 1) configured to accommodate various components illustrated in FIG. 2 is provided.

Alternatively, engaging portions having recessed portions or holes may be disposed in the second housing 27, and projections to be engaged with the recessed portions or the holes may be disposed in the first housing 23.

As illustrated in FIG. 2, as various components accommodated in the housing 20 (see FIG. 1), the rotary apparatus 10 includes: a motor 30, a plurality of gears 60 including an output gear 50 for mechanically rotating the rotary shaft 32 of the motor 30 to the outside, a sensor 70 capable of detecting a rotation angle of an output gear 50, and a flexible wiring board 80 (see FIG. 3) electrically connecting a motor terminal 33 of the motor 30 and a second connection terminal 35 for external connection.

In other words, the motor 30, the plurality of gears 60, the sensor 70, and the flexible wiring board 80 are disposed inside the first housing 23 and the second housing 27 (between the first housing 23 and the second housing 27).

In addition, as illustrated in FIG. 3, the second housing 27 includes an opening portion 25a corresponding to a center portion of the output gear 50.

Figure 4:
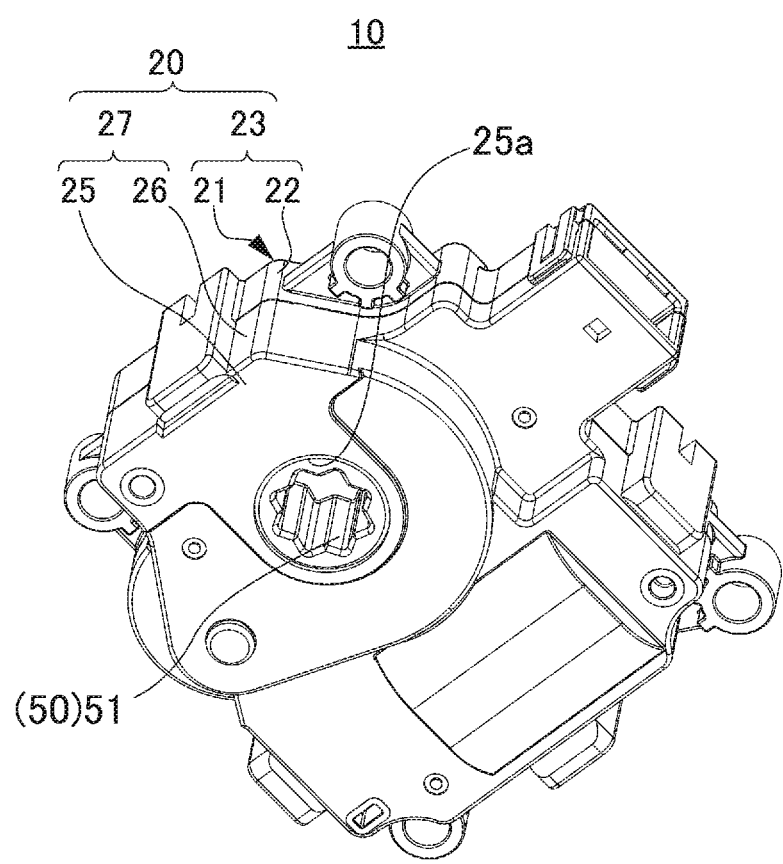
FIG. 4 is a perspective view illustrating the second surface portion side of the second housing of the rotary apparatus according to the first embodiment of the present disclosure.

FIG. 4 is a perspective view of the rotary apparatus 10 in which the second surface portion 25 side of the second housing 27 is viewable.

As illustrated in FIG. 4, the engaging portion 51 of the output gear 50 is accessible from outside through an opening portion 25a provided in the second surface portion 25 of the second housing 27. For example, a drive shaft, not shown, of a louver of an air conditioning system provided in a vehicle such as a car can be engaged with the engaging portion 51 of the output gear 50.

Thus, by rotating the output gear 50, for example, a louver provided in an air conditioner or in an air passage of the air conditioning system provided in a vehicle such as a car is controlled, and, an air flow rate or the like of the air conditioning system is controlled to a predetermined flow rate.

(Motor)

The motor 30 is a drive device for rotating the output gear 50. In the present embodiment, a DC motor is used as the motor 30.

As illustrated in FIGS. 2 and 3, the motor 30 includes a main body portion 31 having an outer shape of a quadrangular prism with curved corner portions, rotary shaft 32 derived from a first end portion 31a of the main body portion 31 rotary shaft, a second end portion 31b located on an opposite side of the first end portion 31a of the main body portion 31, and a pair of motor terminals 33 provided in the second end portion 31b to project outward from the second end portion 31b.

In addition, the first end portion 31a includes a first bearing portion 31aa projecting in a direction (Z-axis direction in FIG. 2) of the rotary shaft 32. The first bearing portion 31aa accommodates a bearing rotatably supporting the rotary shaft 32 and the rotary shaft 32 is derived from the center of the first bearing portion 31aa rotary shaft.

The first bearing portion 31aa rotatably supports the rotary shaft 32.

Likewise, the second end portion 31b also includes a second bearing portion 31bb projecting in the direction of the rotary shaft 32 and accommodating a bearing rotatably supporting the rotary shaft 32.

The second bearing portion 31bb rotatably supports the rotary shaft 32.

The motor 30 includes a stator and a rotor in the main body portion 31, and the rotary shaft 32 is fixed to the rotor.

(Transmission Gear)

As illustrated in FIGS. 2 and 3, the plurality of gears 60 includes a plurality of transmission gears 40. The transmission gears 40 is a gear for transmitting the rotation of the rotary shaft 32 of the motor 30 to the output gear 50 at a predetermined gear ratio.

In the present embodiment, the transmission gears 40 include three gears (a worm gear 41, a first two-stage gear 42, and a second two-stage gear 43).

More specifically, as illustrated in FIG. 2, the transmission gear 40 includes a worm gear 41 fixed to the rotary shaft 32 of the motor 30, the first two-stage gear 42 and the second two-stage gear 43. The first two-stage gear 42 includes a gear 42a having a large diameter meshing with the worm gear 41 and a gear 42b having a small diameter. The second two-stage gear 43 includes a gear 43a having a large diameter meshing with the gear 42b having a small diameter in the first two-stage gear 42 and a gear 43b having a small diameter (see FIG. 3) meshing with the output gear 50.

Note that, in the present embodiment, the first two-stage gear 42 and the second two-stage gear 43 used so as to transmit the rotation of the rotary shaft 32 of the motor 30 to the output gear 50 by adjusting the gear ratio using the limited space, but the present embodiment is not limited to this design.

Another design may be used. For example, the second two-stage gear 43 may be omitted, and instead the output gear 50 may be meshed with the gear 42b having a small diameter of the first two-stage gear 42. Yet another design may be used. For example, the first two-stage gear 42 and the second two-stage gear 43 may be omitted, and instead meshed with the output gear 50 directly to the worm gear 41.

(Output Gear)

As described above, the output gear 50 is a gear meshing with a drive shaft, not shown, of a louver of an air conditioning system and outputting the rotation of the rotary shaft 32 of the motor 30 as a drive force for controlling the drive shaft of the louver.

Note that the present embodiment is not limited to an embodiment in which the drive shaft of the louver is directly meshed with the output gear 50, but instead a gear arranged between the rotary apparatus 10 and the drive shaft of the louver, not shown, may be provided. In this case, the rotary shaft of the arranged gear is meshed with the output gear 50.

(Sensor)

The louver is controlled to be in a predetermined state based on the relationship between the rotation of the output gear 50 and the driving state of the louver.

In order to control the louver, the rotation state (rotation angle) of the output gear 50 needs to be detected. The sensor 70 is a sensor configured to detect the rotation angle of the output gear 50, and more specifically, a sensor configured to output an output signal corresponding to the rotation angle.

Then, rotation control is performed on the motor 30 based on the detected rotation angle of the output gear 50, whereby rotation of the output gear 50 is controlled to maintain the louver, not shown, in a predetermined state.

In the present embodiment, a position sensor of rotary type and resistive type is used as the sensor 70.

More specifically, as illustrated in FIGS. 2 and 3, the sensor 70 includes three first connection terminals 71 for input and output to obtain a rotation angle signal corresponding to the rotation angle of the output gear 50, and a resistor substrate 72. The resistor substrate 72 includes a resin substrate and a resistor printed on the resin substrate. The resistor is electrically connected to the first connection terminals 71.

The sensor 70 further includes a rotating body (not shown), a base portion, and a cover portion 74. The rotating body has a conductive brush, not shown, in contact with the resistor of the resistor substrate 72 and rotating integrally with the output gear 50 detecting the rotation angle. The above components are arranged at the base portion 73. The cover portion 74 is disposed at a position corresponding to the rotating body, not shown, and forms a housing (may be referred to as a sensor housing) of the sensor 70 together with the base portion 73.

The resin substrate for use in the resistor substrate 72 may be an epoxy-based resin substrate having a thickness of, for example, about 300 μm to about 1600 μm. The resin substrate for use in the resistor substrate 72 is harder than a flexible wiring board 80 described below.

Here, a specific operation of the sensor 70 will be briefly described.

The rotating body, not shown, is engaged with the rotary shaft of the output gear 50. The rotating body is rotatably disposed on the base portion 73.

With respect to the resistor substrate 72 spaced apart and above the rotating body, the position of the conductive brush, not shown, disposed on the side of the resistor substrate 72 of the rotating body is configured to change with the rotation of the rotating body.

The conductive brush is in contact with the resistor of the resistor substrate 72.

The change in position of the conductive brush contacting the resistor of the resistor substrate 72 causes a change in resistance value between the input and output terminals. The change in resistance value between the input and output terminals causes a change in output voltage. The rotation angle can be calculated based on the change in the output voltage.

Calculation of the rotation angle based on the change in the output voltage may be carried out in the sensor 70 by with an integrated circuit or the like implemented in the sensor 70. Alternatively, calculation of the rotation angle may be carried out by an externally-provided control device. In the present embodiment, the calculation of the rotation angle is carried out by an externally-provided control device.

The sensor 70 is not limited to the position sensor of rotary type and resistive type, but may be, for example, a sensor of a type in which, using a sensor substrate having a conductive portion formed thereon to allow the conductive brush to repeat ON-OFF operation in accordance with the rotation of the rotating body, the ON-OFF is output.

Such a sensor outputting the ON-OFF can also calculate the rotation angle of the rotating body based on the number of ON-OFF operations.

The base portion 73 includes three first connection terminals 71 for input and output, and two second connection terminals 35 for the motor 30. The first connection terminals 71 serve as connectors of the rotary apparatus 10.

More specifically, as illustrated in FIG. 2, the output gear 50 and the sensor 70 are lined in a direction (X-axis direction) substantially orthogonal to a direction (Z axis direction) of the rotary shaft 32 of the motor 30 and along the second surface portion 25 of the second housing 27. The output gear 50 and the sensor 70 are disposed at the side of the second side wall portion 26 of the second housing 27 farther from the motor 30 in the X-axis direction.

The base portion 73 of the sensor 70 includes a terminal arrangement portion at which terminals are arranged. The second connection terminals 35 for the motor 30 can be arranged at the terminal arrangement portion.

The terminal arrangement portion is formed to project toward the motor 30 from the sensor 70.

The first connection terminals 71 and the second connection terminals 35 are disposed at the terminal arrangement portion. The first connection terminals 71 are disposed farther from the motor 30 in a direction substantially orthogonal to a direction (Z axis direction) of the rotary shaft 32 of the motor 30, and the second connection terminals 35 are disposed closer to the motor 30. By providing the terminal arrangement portion, the motor terminals 33 of the motor 30 and the second connection terminals 35 for the motor 30 can be electrically connected a short distance.

As described above, the base portion 73 of the sensor 70 is configured such that not only the three first connection terminals 71 for input and output of the sensor 70 can be fixed o the base portion 73 but also two second connection terminals 35 for the motor 30 to be fixed to the base portion 73. This configuration can eliminate the need for providing a fine structure for fixing the two second connection terminals 35 for the motor 30 to the housing 20 (see FIG. 1), and thus the mold or the like for molding the housing 20 can be prevented from becoming complicated, and the cost of manufacturing the housing 20 can be reduced.

Alternatively, it is necessary that the terminal arrangement portion of the base portion 73 of the sensor 70 be configured such that the two second connection terminals 35 for the motor 30 can be disposed in the terminal arrangement portion 75. However, as is clear from FIGS. 2 and 3, even if the two second connection terminals 35 are disposed, the base portion 73 remains a very simple shape. Accordingly, the mold or the like are not complicated, and thus an increase in manufacturing cost can be prevented, and the manufacturing cost from the viewpoint of total product cost can be suppressed.

In the present embodiment, as illustrated in FIGS. 2 and 3, the base portion 73 of the sensor 70 includes a projection corresponding to each of the terminals (the first connection terminals 71 and the second connection terminals 35), and the projection is press-fitted into a hole provided in each of the terminals (the first connection terminals 71 and the second connection terminals 35).

With the above configuration, each of the terminals (the first connection terminals 71 and the second connection terminals 35) is fixed to the base portion 73.

The method of fixing each of the terminals (the first connection terminals 71 and the second connection terminals 35) to the base portion 73 is not particularly limited and may be other methods such as fixing with adhesive.

Note that by arranging the second connection terminals 35 at the base portion 73, the second connection terminals 35 can be prevented from contacting the parts accommodated in the housing 20 (see FIG. 1) and reliability can be improved.

Note also that by collectively arranging the three first connection terminals 71 for input and output of the sensor 70 and the two second connection terminals 35 for the motor 30 on the base portion 73, storage of the terminal can be prevented from becoming complex and the size of the entire rotary apparatus 10 can be reduced.

The two second connection terminals 35 for the motor 30 are placed and fixed to the terminal arrangement portion of the base portion 73, and electrically connected to the respective motor terminals 33 of the motor 30 by the flexible wiring board 80 illustrated in FIG. 3.

(Flexible Wiring Board)

The flexible wiring board 80 includes a film, an adhesive layer formed on the film, and a conductor printed or laminated on the adhesive layer. The film is formed with, for example, an insulating resin material such as polyimide and polyester and has a thickness of 12 µm to 50 µm.

The adhesive layer is formed with a resin material such as an epoxy resin material and an acrylic resin material.

The conductor is formed with a metal member such as copper foil having a thickness of about 12 µm to about 50 µm.

Even if bent at an angle of 90 degrees or more, the flexible wiring board 80 can be restored to the original form, i.e., the form before folding, and thus the connection work between the second connection terminals 35 for the motor 30 and the motor terminals 33 is facilitated.

Now the description will focus on an example of a specific connection work with reference to FIG. 3. As illustrated in FIG. 3, the second connection terminal 35 includes a connection portion 35a bent at a base end portion opposite to a distal end portion. The hole 81 of the flexible wiring board 80 is engaged with the connection portion 35a. Then, the second connection terminal 35 and the flexible wiring board 80 are connected by soldering.

Note that in FIG. 3, the motor 30 is disposed in the second housing 27. Before the motor 30 is disposed as described above, the holes 82 of the flexible wiring board 80 are engaged with the motor terminals 33 of the motor 30, and then the motor terminals 33 are connected to the flexible wiring board 80 by soldering. Thus, the connection work between the motor terminals 33 of the motor 30 and the second connection terminal 35 by the flexible wiring board 80 is completed.

In the present embodiment, a replicated portion 83 having a folded structure is provided at a portion of the flexible wiring board 80 between a portion having the holes 81 to a portion having the holes 82. The replicated portion 83 serves to place the portion having the holes 81 the portion having the holes 82 to be in a substantially orthogonal relationship.

By providing the replicated portion 83 described above, even if the rotary apparatus 10 vibrates, the replicated portion 83 absorbs the vibration. Thus, the flexible wiring board 80 is less likely to suffer damage or the like and long-term reliability can be improved.

The electrical connection between the second connection terminals 35 for the motor 30 and the motor terminals 33 may be a connection using a lead wire.

In the case of using a lead wire, the lead wire itself is thin and difficult to handle. Thus, as in the present embodiment, it is preferable to use the flexible wiring board 80, since it is easy to handle.

Thus, by providing the electrical connection between the second connection terminals 35 for the motor 30 and the motor terminals 33 by the flexible wiring board 80, the assembly work of the rotary apparatus 10 can be facilitated and the manufacturing cost can be reduced.

(Improved Quietness)

The present inventors have made zealous studies on the rotary apparatus 10 having the basic configuration as described above, and have found that by devising a manner of fixing the motor 30 to the housing 20 (see FIG. 1), noise can be reduced by about 1.5 dB and quietness can be improved.

In the present embodiment, the manner of fixing found as being capable of improving quietness is employed. This will be described below in detail.

Figure 5:
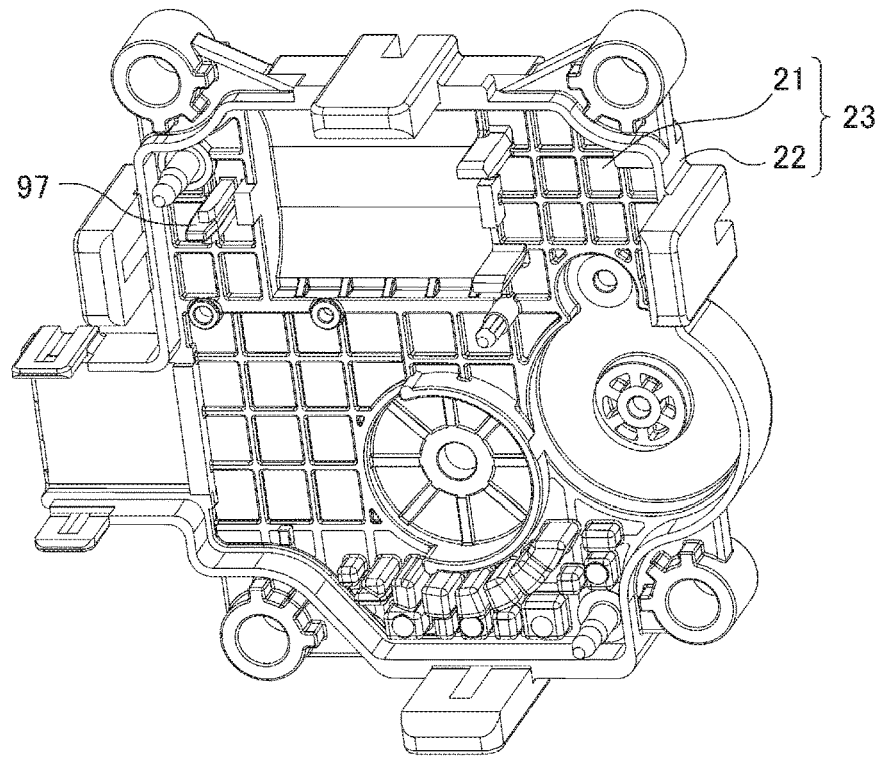
FIG. 5 is a perspective view illustrating the rotary apparatus according to the first embodiment of the present disclosure with the first housing and the second housing being separated and various parts accommodated in the housings being omitted to show inside of the housing.
Figure 5:
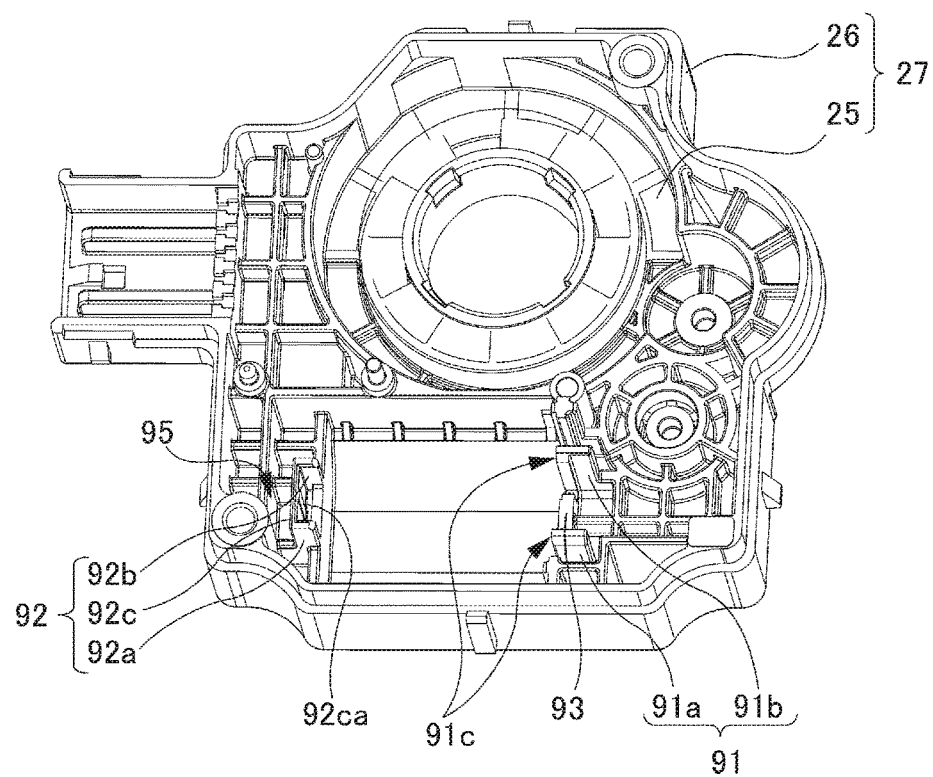

FIG. 5 is a perspective view illustrating of the rotary apparatus 10. The housing 20 of the rotary apparatus 10 is separated into the first housing 23 and the second housing 27, and various parts accommodated in the housing 20 are omitted to show the inside of the housing 20.

As illustrated in FIGS. 2 and 5, the second housing 27 includes a first regulating portion 91 regulating a position of a part of the first end portion 31a of the motor 30 and a second regulating portion 92 regulating a position of a part of the second end portion 31b of the motor 30.

Thus, the first regulating portion 91 suppresses the part of the first end portion 31a of the motor 30 from being displaced toward the second sidewall portion 26 of the second housing in the rotary shaft direction.

Likewise, the second regulating portion 92 suppresses the part of the second end portion 31b of the motor 30 from being displaced toward the second sidewall portion 26 of the second housing in the rotary shaft direction.

As illustrated in FIG. 2, the first regulating portion 91 includes a pair of projecting portions 91a and 91b projecting from the second surface portion 25 of the second housing 27 toward the first housing 23.

The pair of projecting portions 91a and 91b are arranged side by side in a direction crossing the direction of the rotary shaft (in a direction orthogonal to the direction of the rotary shaft in the illustrated exemplary embodiment).

The first bearing portion 31aa of the first end portion 31a of the motor 30 is arranged between the pair of projecting portions 91a and 91b.

The first bearing portion 31aa may be sandwiched between the pair of projecting portions 91a and 91b.

Note that a support portion 93 (see FIG. 5) receiving the second housing 27 side of the first bearing portion 31aa of the motor 30 is arranged between the pair of projecting portions 91a and 91b. The support portion 93 may be connected to the pair of projecting portions 91a and 91b.

The pair of projecting portions 91a and 91b each have a surface 91c (see FIG. 5) facing the motor 30.

The surface 91c contacts the first end portion 31a of the motor 30.

More specifically, the first end portion 31a has a surface facing the surface 91c, and the surface is located at a position outward of the first bearing portion 31aa. The surface facing the surface 91c contacts the surface 91c.

Thus, the surface 91c contacts the first end portion 31a to regulate the position of the part of the first end portion 31a of the motor 30.

As illustrated in FIG. 5, the second regulating portion 92 has a substantially U-shape in a plan view as viewed from the first housing 23 side.

The second regulating portion 92 includes a recessed portion recessed toward a direction away from the motor 30 (see FIG. 2) and accommodating a second bearing portion 31bb (see FIG. 2).

More specifically, as illustrated in FIG. 2, the second regulating portion 92 projects from the second surface portion 25 of the second housing 27 toward the first housing 23 side.

The second regulating portion 92 includes a pair of side portions 92a and 92b and a wall portion 92c connecting the pair of side portions 92a and 92b.

The pair of side portions 92a and 92b are arranged side by side in a direction crossing a direction (Z-axis direction) of the rotary shaft 32 of the motor 30 (in a direction substantially orthogonal to the direction of the rotary shaft 32 in the illustrated exemplary embodiment).

In addition, a second bearing portion 31*bb* of the second end portion 31*b* of the motor 30 is arranged between the pair of side portions 92*a* and 92*b*.

In the illustrated exemplary embodiment, the second bearing portion 31*bb* is arranged between the pair of side portions 92*a* and 92*b*.

The wall portion 92*c* is provided on the end portion side of the second bearing portion 31*bb* and connects the pair of side portions 92*a* and 92*b*.

The wall portion 92*c* faces the end portion of the second bearing portion 31*bb*, and the end portion of the second bearing portion 31*bb* faces the wall portion 92*c* and the second sidewall portion 26 of the second housing 27.

In the state in which the first housing 23 is separated from the second housing 27 and the motor 30 is disposed in the second housing 27 as illustrated in FIG. 2, the first end portion 31*a* of the motor 30 contacts the surface 91*c* (see FIG. 5) on the motor 30 side of the first regulating portion 91.

More specifically, the first end portion 31*a* has a surface facing the surface 91*c*, and the surface is located at a position outside the first bearing portion 31*aa*. The surface facing the surface 91*c* contacts the surface 91*c*.

In the state in which the first housing 23 is separated from the second housing 27 and the motor 30 is disposed in the second housing 27 as illustrated in FIG. 2, the second bearing portion 31*bb* of the second end portion 31*b* of the motor 30 contacts the wall portion 92*c* provided on the end portion side of the second bearing portion 31*bb* of the second regulating portion 92.

Thus, in the state in which the first housing 23 is separated from the second housing 27 and the motor 30 is disposed in the second housing 27 as illustrated in FIG. 2, the motor 30 is press-fitted between the first regulating portion 91 and the second regulating portion 92.

In order to achieve the above configuration, the second housing 27 includes the first regulating portion 91 and the second regulating portion 92.

Note that as illustrated in FIG. 5, the wall portion 92*c* of the second regulating portion 92 includes a surface facing the motor 30. A projecting portion 92*ca* having a linear shape is formed on the surface facing the motor 30.

The projecting portion 92*ca* ensures reliable press-fitting of the motor 30.

As described above, the motor 30 is press-fitted and fixed between the first regulating portion 91 and the second regulating portion 92. Thus, it has been considered that even if vibration may occur inside the motor 30, the vibration of the main body portion 31 itself of the motor 30 is suppressed.

However, by pressing the various portions of the main body portion 31 of the motor 30 and examining the noise after pressing, it was found that when the wall portion 92*c* of the second regulating portion 92 was strongly pressed toward the first regulating portion 91, the noise was greatly reduced.

In view of this, in the present embodiment, the configuration as illustrated in FIGS. 2 and 5 is employed.

Specifically, the second housing 27 includes a receiving portion 95 (see FIGS. 5 and 7) located at a position spaced apart by a predetermined distance from the second bearing portion 31*bb* of the second end portion 31*b* of the motor 30 in a direction (Z-axis direction in FIG. 2) of the rotary shaft 32, i.e., a position spaced apart by a predetermined distance from the wall portion 92*c* of the second regulating portion 92 toward a direction away from the motor 30.

On the other hand, the first housing 23 includes a projecting portion 97. The projecting portion 97 projects toward the second housing 27 and is inserted into a position between the receiving portion 95 and the second end portion 31*b* of the motor 30, i.e., a position between the receiving portion 95 and the wall portion 92*c* of the second regulating portion 92.

The projecting portion 97 is inserted between the receiving portion 95 and the second end portion 31*b* of the motor 30 to apply an urging force for urging the second end portion 31*b* of the motor 30 toward the first regulating portion 91.

In other words, the projecting portion 97 of the first housing 23 urges the second end portion 31*b* of the motor 30 toward the first regulating portion side via the wall portion 92*c* as another member.

Figure 7:
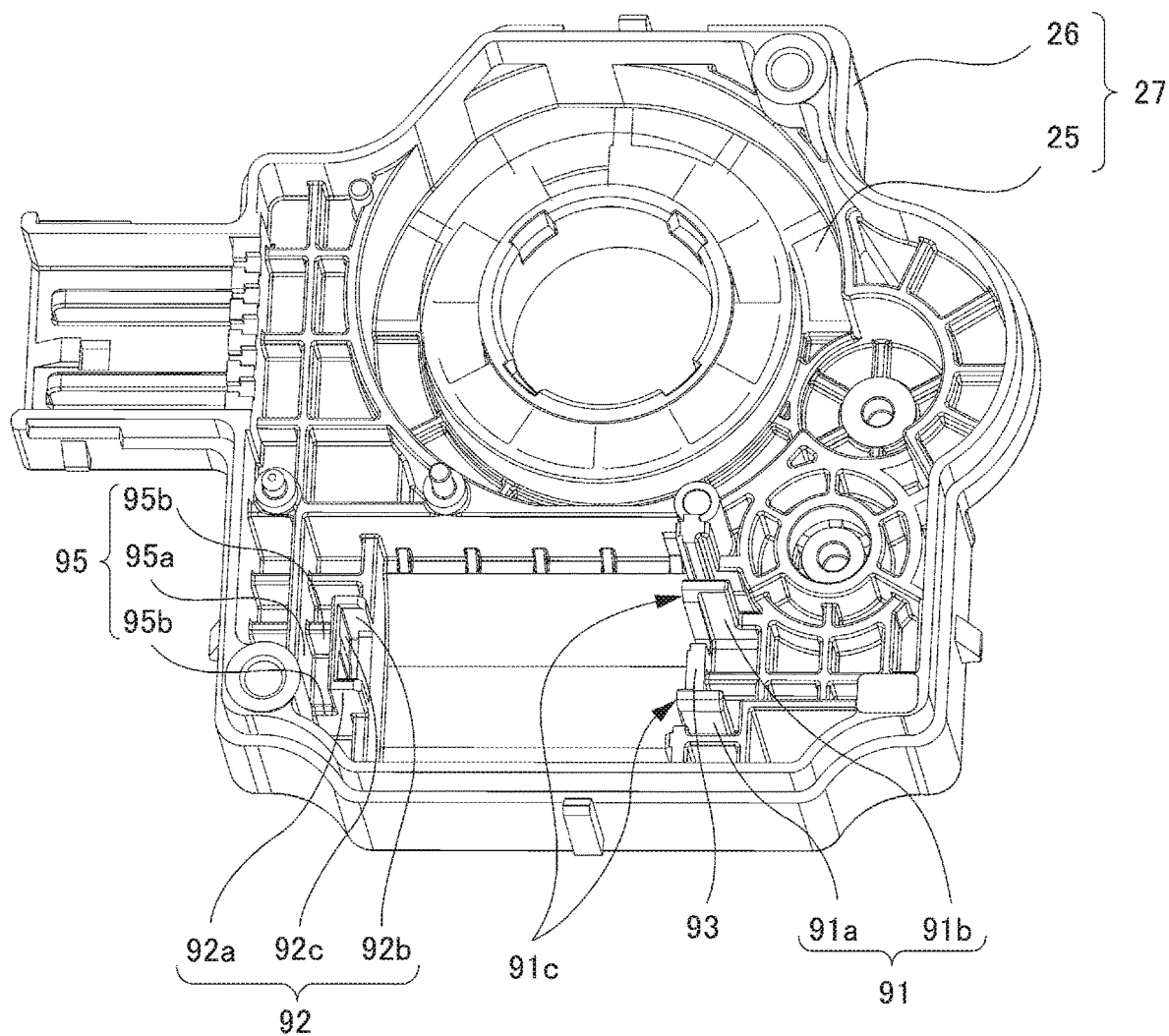
FIG. 7 is a perspective view illustrating the second housing according to the first embodiment of the present disclosure.

FIG. 7 is a perspective view of the second housing 27 illustrating inside of the second housing 27.

In the present embodiment, the receiving portion 95 forms a space for accommodating a part of the projecting portion 97.

Specifically, as illustrated in FIG. 7, the receiving portion 95 includes a surface portion 95*a* facing the wall portion 92*c* and a pair of side portions 95*b* connecting the surface portion 95*a* and the wall portion 92*c*.

The receiving portion 95 may include at least the surface portion 95*a* facing the wall portion 92*c*. In other words, the pair of side portions 95*b* connecting the surface portion 95*a* and the wall portion 92*c* are not an essential requirement.

FIG. 5 illustrates the state in which the first housing 23 is separated from the second housing 27 and the motor 30 is not disposed.

In the state in which the first housing 23 is separated from the second housing 27 and the motor 30 is not disposed as illustrated in FIG. 5, the receiving portion 95 is disposed at a position spaced apart by a first distance (hereinafter referred to as a first spacing distance) from the wall portion 92*c* in the direction (Z-axis direction in FIG. 2) of the rotary shaft 32.

In the direction (Z-axis direction in FIG. 2) of the rotary shaft 32, the width of the portion of the projecting portion 97 provided in the first housing 23 inserted between the receiving portion 95 and the wall portion 92*c* is greater than the first spacing distance.

In the present embodiment, the distal end portion of the projecting portion 97 is wedge-shaped and has a size smaller than the first distance at the tip so that the projecting portion 97 can be smoothly inserted between the receiving portion 95 and the wall portion 92*c*.

Here, the distal end portion of the projecting portion 97 is an end portion of the projecting portion 97 on the second housing 27 side.

In addition, as illustrated in FIG. 5, the width of the distal end portion in the direction (Z-axis direction in FIG. 2) of the rotary shaft 32 is smaller than the first spacing distance.

Figure 6:
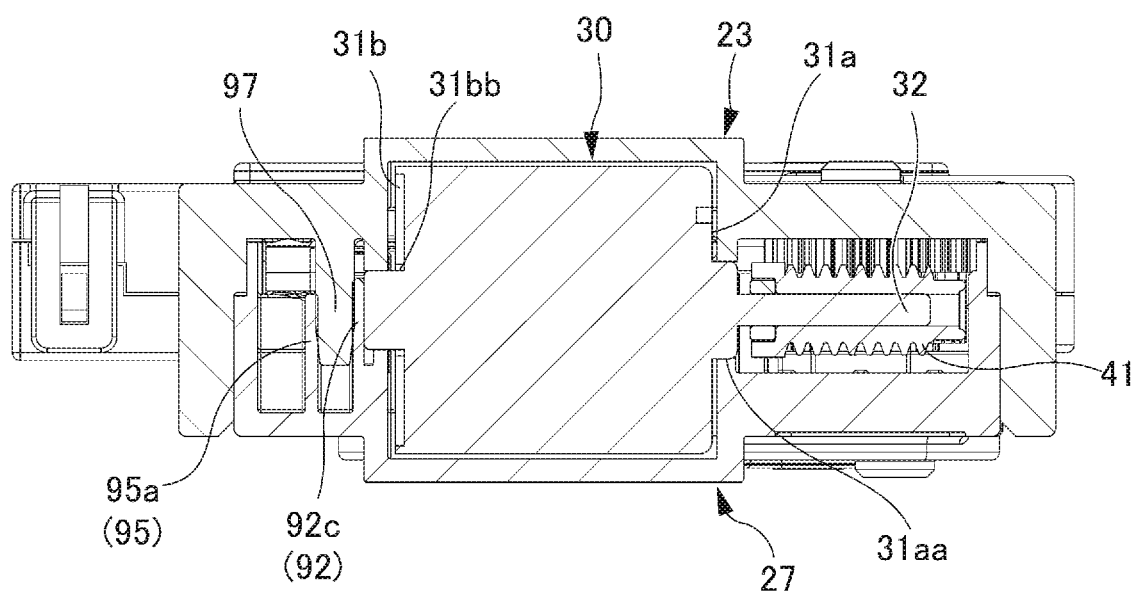
FIG. 6 is a sectional view taken along rotary shaft of the rotary apparatus according to the first embodiment of the present disclosure.

FIG. 6 is a sectional view taken along the rotary shaft 32 of the rotary apparatus 10.

Note that the internal structure of the motor 30 is not illustrated in FIG. 6.

The distal end portion of the projecting portion 97 is wedge-shaped so that when the first housing 23 is joined to the second housing 27, the distal end portion of the projecting portion 97 is smoothly inserted between the receiving portion 95 and the wall portion 92*c*.

Note that the width of the distal end portion of the projecting portion 97 is smaller than the width of a gap between the receiving portion 95 and the wall portion 92c in the direction of the rotary shaft 32.

On the other hand, the width of an intermediate portion of the projecting portion 97 and the width of the base end portion of the projecting portion 97 are greater than the width of the gap between the receiving portion 95 and the wall portion 92c.

In other words, the width of the projecting portion 97 increases from the distal end portion of the projecting portion 97 to the base end portion.

Note that the intermediate portion of the projecting portion 97 lies between the distal end portion and the base end portion, and the base end portion of the projecting portion 97 is an end portion of the projecting portion 97 located on an opposite side with respect to the distal end portion.

When joining the first housing 23 to the second housing 27, the intermediate portion of the projecting portion 97 having a width greater than the first spacing distance between the receiving portion 95 and the wall portion 92c is press-fitted between the receiving portion 95 and the wall portion 92c.

When the first housing 23 is completely joined to the second housing 27 to come to the state of the housing 20 as illustrated in FIG. 6, the projecting portion 97 comes to a state of strongly urging the second bearing portion 31bb toward the first regulating portion 91 (see FIGS. 2 and 5) via the wall portion 92c. In this state, noise can be greatly reduced.

The reason why noise can be greatly reduced by such a configuration is presumably because vibration of the main body portion 31 of the motor 30 in the direction (Z-axis direction in FIG. 2) of the rotary shaft 32 caused by torque ripple of the motor 30 is suppressed.

More specifically, the motor 30 rotatably supports the rotary shaft 32 fixed to the rotor by a bearing to allow the rotor to rotate relative to the stator. Since the rotary shaft 32 is rotatably supported, a certain degree of clearance in the axial direction is allowed for the rotary shaft 32 itself.

The movement of the rotary shaft 32 in the direction (Z-axis direction in FIG. 2) of the rotary shaft 32 due to the clearance allowed for the rotary shaft 32 is suppressed as described below. Specifically, the center of the stator and the center of the rotor magnet are shifted in the direction (Z-axis direction in FIG. 2) of the rotary shaft 32, and the rotary shaft 32 is drawn toward one side in the direction (Z-axis direction in FIG. 2) of the rotary shaft 32. Thus, the movement of the rotary shaft 32 in the direction (Z-axis direction in FIG. 2) of the rotary shaft 32 can be suppressed.

However, in order to rotate the rotor, it is required to switch the current between a plurality of coils provided in the stator. When switching the current, a change in attraction occurs between the stator and the rotor magnet as described above. Accordingly, the rotary shaft 32 comes to a state where the rotary shaft 32 is ready to move in the direction (Z-axis direction in FIG. 2) of the rotary shaft 32.

Here, in the state in which the motor 30 is disposed in the rotary apparatus 10, the rotary shaft 32 is connected to the first two-stage gear 42 via the worm gear 41. Thus, the rotary shaft 32 is also a fixed end. When a change in attraction between the stator and the rotor magnet occurs, a force which would cause a movement in the direction (Z-axis direction in FIG. 2) of the rotary shaft 32 is exerted on the main body portion 31 of the motor 30. The stator is fixed to the main body portion 31 of the motor 30 rotary shaft. It is considered that, as a result, the motor 30 vibrates in the direction (Z-axis direction in FIG. 2) of the rotary shaft 32.

If the vibration of the motor 30 in the direction (Z-axis direction in FIG. 2) of the rotary shaft 32 is not suppressed by press-fitting the motor 30 between the first regulating portion 91 and the second regulating portion 92, the motor 30 is more strongly urged toward the first regulating portion 91. Thus, the vibration of the motor 30 in the direction (Z-axis direction in FIG. 2) of the rotary shaft 32 can be suppressed, and this is considered to be the reason for why it is possible to reduce noise greatly.

Note that if, before the projecting portion 97 is inserted between the receiving portion 95 and the wall portion 92c, the press-fitting force of the motor 30 with respect to the first regulating portion 91 and the second regulating portion 92 is increased, the press-fitting itself for attaching the motor 30 to the second housing 27 becomes difficult, and also removal of the motor 30 from the second housing 27 becomes difficult.

For this reason, the press-fitting force of the motor 30 with respect to the first regulating portion 91 and the second regulating portion 92 is preferably set to a strength allowing attachment and removal of the motor 30 to and from the second housing 27.

However, with a press-fitting force taking attaching and removing the motor 30 to and from the second housing 27 into consideration, in some cases, vibration of the motor 30 in the direction (Z-axis direction in FIG. 2) of the rotary shaft 32 may not be sufficiently reduced.

In contrast to this, according to the configuration of the present embodiment, even if the press-fitting force of the motor 30 with respect to the first regulating portion 91 and the second regulating portion 92 is set to a strength allowing attachment and removal of the motor 30 to and from the second housing 27, when the first housing 23 is joined to the second housing 27, an urging force by the projecting portion 97 is applied to the motor 30. Thus, the vibration of the motor 30 in the direction (Z-axis direction in FIG. 2) of the rotary shaft 32 can be positively suppressed.

Therefore, with the present embodiment, a good balance between ease of attaching and removing the motor 30 to and from the second housing 27 and quietness due to suppressed vibration can be easily achieved.

It has been described above that the receiving portion 95 is located inside the second sidewall portion 26 of the second housing 27 and projects toward the first housing 23, but the second sidewall portion 26 itself may be used as the receiving portion 95.

Also, it has been described above that, even in the state in which the first housing 23 is separated from the second housing 27, the first regulating portion 91 and the second regulating portion 92 are arranged such that the motor 30 is press-fitted between the first regulating portion 91 and the second regulating portion 92. If the width of the projecting portion 97 in the direction (Z-axis direction in FIG. 2) of the rotary shaft 32 is large enough to urge the motor 30 toward the first regulating portion 91, regardless of the press-fitting of the motor 30 between the first regulating portion 91 and the second regulating portion 92, the motor 30 is sufficiently pressed toward the first regulating portion 91 by the projecting portion 97.

For this reason, the motor 30 may not necessarily be press-fitted between the first regulating portion 91 and the second regulating portion 92 in a state where the first housing 23 is separated from the second housing 27. The first regulating portion 91 and the second regulating portion 92 may regulate the position of the motor 30 such that the motor 30 is placed at a substantially predetermined position.

Specifically, the width of the motor 30 in the direction of the rotary shaft 32 may be equal to or smaller than the distance between the first regulating portion 91 and the second regulating portion 92.

Note that even in the state where the first housing 23 is separated from the second housing 27, the motor 30 is preferably press-fitted between the first regulating portion 91 and the second regulating portion 92. The reason for this is that when assembling the rotary apparatus 10, the positioning of the motor 30 in the second housing 27 can be ensured, and workability is good.

In the above embodiment, the receiving portion 95 and the projecting portion 97 are disposed on the second regulating portion 92 side in order to press the motor 30 toward the first regulating portion 91, but the receiving portion 95 and the projecting portion 97 may be disposed in order to press the motor 30 toward the second regulating portion 92.

In this case, the rotary shaft 32 is derived from the first end portion 31a of the motor 30. Thus, like the above embodiment, the receiving portion may be disposed at a position of the second housing 27 where a surface to come into contact with the first end portion 31a can be formed and at a position avoiding the derived rotary shaft 32.

For example, the second housing 27 may be disposed such that the receiving portion faces the first end portion 31a at a position outwardly of the first bearing portion 31aa of the first end portion 31a.

The first housing 23 may include a projecting portion inserted at a position between the receiving portion and the first end portion 31a of the motor 30 (for example, the first end portion 31a at a position outwardly of the first bearing portion 31aa of the first end portion 31a) so as to contact the receiving portion.

Second Embodiment

Figure 8:
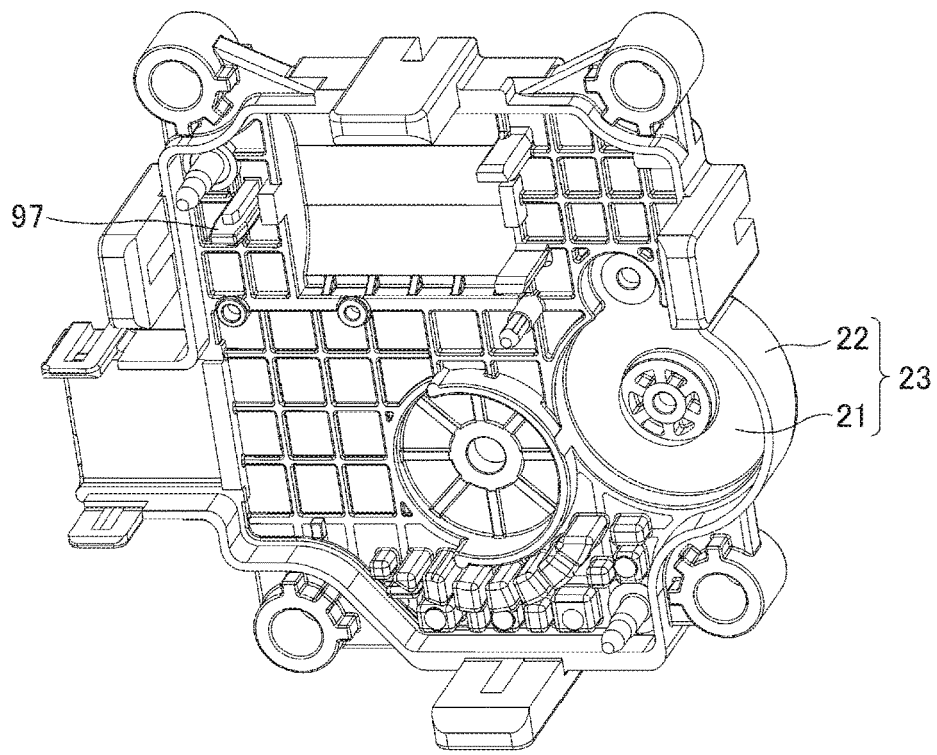
FIG. 8 is a perspective view illustrating a housing according to a second embodiment of the present disclosure.
Figure 8:
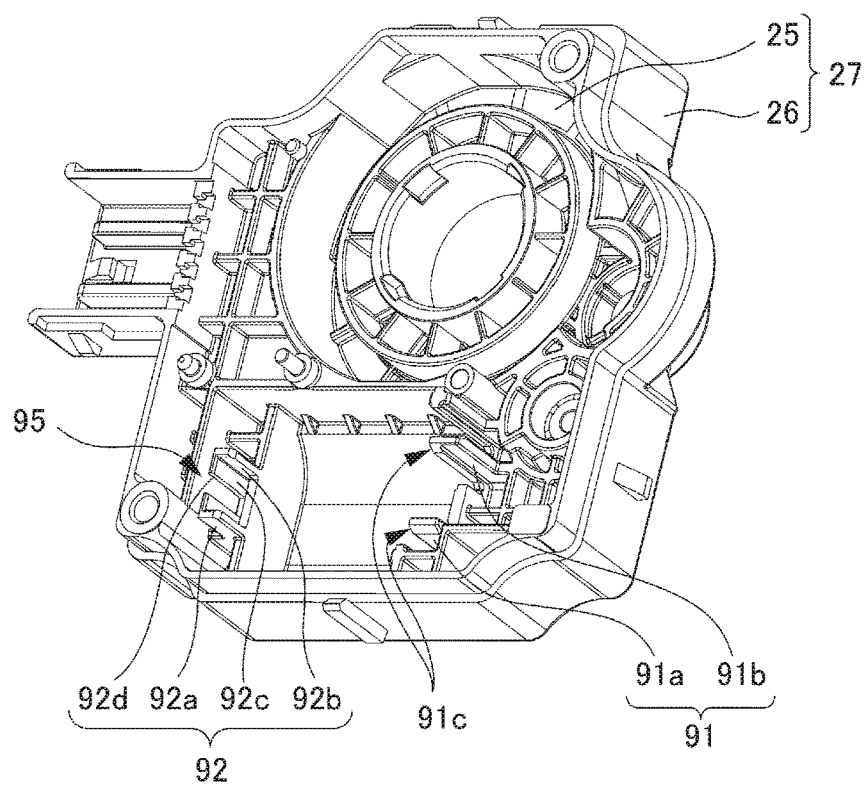
Figure 9:
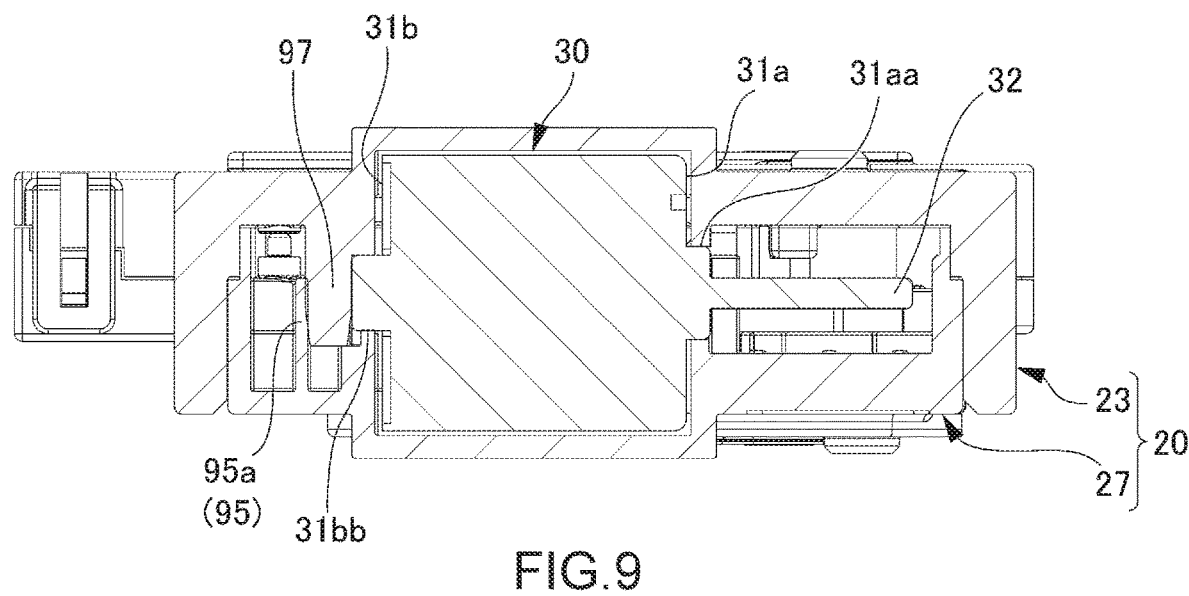
FIG. 9 is a sectional view taken along the rotary shaft of the rotary apparatus according to the second embodiment of the present disclosure for illustrating a state in which a motor is disposed in the housing.

Referring now to FIGS. 8 and 9, the rotary apparatus 10 according to the second embodiment will be described.

The basic configuration of the second embodiment is the same as the basic configuration of the first embodiment. Thus, the following description mainly focuses on components different from the components of the first embodiment and similar description may be omitted.

FIG. 8 is a perspective view illustrating the housing 20 according to the second embodiment.

Note that the FIG. 8 corresponds to FIG. 5 and FIG. 8 is a diagram illustrating the housing 20 with the first housing 23 being separated from the second housing 27 and various parts accommodated in the housing 20 being omitted to show inside of the housing 27.

Note that in the following description, when describing similar components, the figures used in the first embodiment may be referred to.

As illustrated in FIG. 8, the second embodiment is the same as the first embodiment in that the second regulating portion 92 of the second housing 27 includes a pair of side portions 92a and 92b and a wall portion 92c disposed on the end portion side of the second bearing portion 31bb and connecting the pair of side portions 92a and 92b. The pair of side portions 92a and 92b project from the second surface portion 25 of the second housing 27 toward the first housing 23. The second bearing portion 31bb (see FIG. 2) of the second end portion 31b (see FIG. 2) of the motor 30 (see FIG. 2) is provided between the pair of side portions 92a and 92b. The pair of side portions 92a and 92b are disposed in a direction crossing the direction (Z-axis direction in FIG. 2), i.e., a substantially orthogonal direction in the illustrated example, of the rotary shaft 32 of the motor 30 (see FIG. 2).

On the other hand, as illustrated in FIG. 8, the second housing 27 of the second embodiment is different from the second housing 27 of the first embodiment in that the wall portion 92c of the second regulating portion 92 includes a recessed portion 92d opened on the first housing 23 side to insert the projecting portion 97 of the first housing 23.

Accordingly, the width of the projecting portion 97 of the second embodiment in the direction (Z-axis direction in FIG. 2) of the rotary shaft 32 is designed to be larger toward the motor 30 than the width of the projecting portion 97 of the first embodiment illustrated in FIG. 5.

More specifically, in the state in which the first housing 23 is separated from the second housing 27 and the motor 30 is disposed in the second housing 27, the receiving portion 95 is disposed to be spaced apart by a first distance (hereinafter referred to as a first spacing distance) from the second bearing portion 31bb in the direction (Z-axis direction in FIG. 2) of the rotary shaft 32.

Note that the first distance of the second embodiment refers to a distance from the second bearing portion 31bb, and thus a little longer than the first distance of the first embodiment in terms of a quantitative distance.

However, the first distance of the second embodiment may be made to be the same as the first distance of the first embodiment in terms of the quantitative distance by placing the receiving portion 95 at a position closer toward the second bearing portion 31bb.

In the direction of the rotary shaft 32, the width of a portion of the projecting portion 97 disposed in the first housing 23 inserted between the receiving portion 95 and the wall portion 92c is larger than the first spacing distance.

The distal end portion of the projecting portion 97 is wedge-shaped and has a size smaller than the first distance at the tip so that the projecting portion 97 can be smoothly inserted between the receiving portion 95 and the second bearing portion 31bb.

FIG. 9 is a sectional view taken along the rotary shaft 32 for describing a state in which the motor 30 is disposed in the housing 20.

Note that in FIG. 9, the internal structure of the motor 30 and the worm gear 41 or the like disposed in the housing 20 are omitted.

As illustrated in FIG. 9, in the second embodiment, the projecting portion 97 directly urges the second bearing portion 31bb toward the first regulating portion 91 (see FIG. 2).

The projecting portion 97 is press-fitted between the receiving portion 95 and the second bearing portion 31bb, and the projecting portion 97 directly strongly presses the motor 30 to the first regulating portion 91.

Like the first embodiment, with the configuration of the second embodiment, the vibration of the motor 30 in the direction (Z-axis direction in FIG. 2) of the rotary shaft 32 can be positively suppressed, and noise can be suppressed.

Note that also in the second embodiment, with the first housing 23 being separated from the second housing 27, the second regulating portion 92 includes the wall portion 92c contacting the second bearing portion 31bb so that the motor 30 is press-fitted between the first regulating portion 91 and the second regulating portion 92. However, with the first housing 23 being separated from the second housing 27, if the motor 30 is not press-fitted between the first regulating portion 91 and the second regulating portion 92, the second regulating portion 92 may include only the pair of side portions 92a and 92b without the wall portion 92c.

In the present embodiment, as illustrated in FIGS. 2 and 5, the projecting portion 97 is inserted into a position between the receiving portion 95 and the second end portion 31b of the motor 30 to urge the second end portion 31b of the motor 30 toward the first regulating portion 91, but the present embodiment is not limited to this configuration.

For example, the projecting portion 97 may be inserted into a position between the receiving portion 95 and the second end portion 31b of the motor 30 thereby to deform the receiving portion 95.

The vibration of the main body portion 31 itself of the motor 30 can be suppressed by applying a reaction force from the deformed second regulating portion 92 to the projecting portion 97.

In addition, the projecting portion 97 may be inserted into a position between the receiving portion 95 and the second end portion 31b of the motor 30 to cause friction among the second end portion 31b, the projecting portion 97, and the receiving portion 95. Thus, the vibration of the main body portion 31 itself of the motor 30 can be damped and propagation of the vibration to outside can be suppressed.

In addition, the projecting portion 97 may be inserted into a position between the receiving portion 95 and the second end portion 31b of the motor 30 to improve the flexural rigidity of the projecting portion 97 and the receiving portion 95 as a whole.

The improved flexural rigidity helps prevent the projecting portion 97 and the receiving portion 95 as a whole from being deformed by the vibration of the main body portion 31 itself of the motor 30. Thus, the magnitude (amplitude) of the vibration propagating outside via a member can be decreased.

The above first embodiment and second embodiment include the following concepts. The embodiments include the first housing 23, the second housing 27, and the motor 30.

The motor 30 is arranged between the first housing 23 and the second housing 27.

The first housing 23 includes the first projecting portion (corresponding to the projecting portion 97) projecting toward the second housing 27. The first projecting portion is provided inside the first housing 23. The first projecting portion is provided inside the first housing.

The second housing 27 includes a contact portion contacting one surface of the two surfaces of the motor 30 in the direction of the rotary shaft 32.

As used herein, the term "two surfaces" of the motor 30 correspond to the first end portion 31a and the second end portion 31b in the first and second embodiments.

The term "one surface" corresponds to the first end portion 31a or the second end portion 31b.

The first projecting portion (corresponding to the projecting portion 97) urges the other surface toward the contact portion directly or via another member.

As used herein, the term "another member" refers to, for example, the wall portion 92c of the second regulating portion 92 of the motor 30 in the first and second embodiments.

Hereinbefore, embodiments of the present disclosure have been described, but the present disclosure is not limited to the above embodiments, and it will be apparent that various modifications can be made without departing from the spirit and scope of the present disclosure.

Such various modifications made within the spirit and scope of the present disclosure are also included in the technical scope of the present disclosure. This is apparent to those skilled in the art from the scope of claims.

What is claimed is:

1. A rotary apparatus comprising:
a motor including a rotary shaft;
a plurality of gears including an output gear; and
a housing accommodating the motor and the plurality of gears,
wherein
the housing is separable into a first housing and a second housing;
the motor includes a first end portion and a second end portion located on an opposite side of the first end portion, the rotary shaft being derived from the first end portion;
the second housing includes a first regulating portion regulating a position of a part of the motor on the first end portion side;
the first housing includes a projecting portion projecting toward the second housing side; and
the projecting portion urges the second end portion of the motor toward the first regulating portion side directly or via another member;
the second housing includes a second regulating portion regulating a position of a part of the motor on the second end portion side;
the second regulating portion includes a wall portion facing the second bearing portion in the rotary shaft direction;
the wall portion includes a recessed portion open toward the first housing side; and
the projecting portion is inserted into the recessed portion.

2. The rotary apparatus according to claim 1, wherein the width of a part of the projecting portion inserted between the receiving portion and the second bearing portion is greater than a first distance.

3. The rotary apparatus according to claim 1, wherein a distal end portion of the projecting portion is wedge-shaped and has a size smaller than the first distance at a tip of the distal end portion.

* * * * *